United States Patent Office 2,998,338
Patented Aug. 29, 1961

2,998,338
ORGANIC FIBERS IMPREGNATED WITH DINITROSORESORCINOL
Ching C. Tung, Kirkwood, Mo., assignor to Monsanto Chemical Company, St. Louis, Mo., a corporation of Delaware
No Drawing. Filed June 8, 1959, Ser. No. 818,525
9 Claims. (Cl. 154—52)

This invention relates to the treatment of fibers. More particularly it relates to a method of obtaining improved adhesion or bonding between rubber and fibers either in the form of yarn, cord, fabric or filaments, and to the products obtained thereby. This invention is particularly applicable to the improvement in adhesion between rubber and synthetic fibers.

An object of the invention is to improve the bonding of fibers to rubber. A particular object is to provide a chemical treatment for commercial rayon or nylon or other synthetic fibers for the purpose of increasing the adhesion to natural or synthetic rubber in reinforced rubber products. Other objects are to provide a method of treating fibers to increase their adhesion to rubber and to provide vulcanized fiber reinforced rubber articles characterized by a fiber-rubber bond of increased strength. Another object is to provide impregnated fibers which adhere to rubber. A further object is to provide nylon fibers resistant to heat degradation. Still further objects will be apparent from the description following.

The poor adhesion of textile fibers, fabrics, and the like to rubber has constituted a serious obstacle in the manufacture of laminated rubber articles such as automobile tires, belts and hose. Textile fibers, especially synthetic fibers like rayon cord, do not adhere strongly to vulcanizable rubber stocks when the two are united and the rubber subsequently vulcanized. On the other hand, cords of regenerated cellulose and other synthetic fibers such as nylon are desirable because of tensile strengths superior to natural fibers. Therefore, there has been considerable demand for satisfactory agents to improve the adhesion between the cord or fabric and the rubber.

There has not heretofore existed any acceptable means for treating rayon tire cord at the site of its manufacture. The practice has been to dip the cord in the mixture of latex and resins just prior to use. The treatment of cord in this manner interferes with the processing and cannot be adapted to rayon manufacturing operations. The procedure of this invention permits application to the cord without interfering with cord processed at the manufacturing site.

It is known that nitroso substituted anilines and nitroso substituted benzenes have the properties of increasing adhesion of fibers to rubber. For example, increasing the adhesion of rayon to rubber by treating the cord with p-nitroso dimethylaniline has been demonstrated by comparing the force required to peel the exposed treated cord from a strip of rubber with that required to peel the untreated cord from the same rubber stock under similar conditions. However, extensive investigation of forces acting on fiber-reinforced rubber commonly used in tires led to the conclusion that the shear forces acting across the fiber-rubber interface are of primary importance. It has been maintained by such investigators as J. O. Wood that adhesion failure in a tire is largely due to shear forces transmitted across the cord-rubber interface, see Pull-Through Adhesion Test by J. O. Wood, Textile Research Division, Research Centre, Fort Dunlop, Transactions of the Institution of The Rubber Industry, vol. 32, No. 1, pages 1–18. This view has been generally accepted and tests designed to measure shear forces. Accordingly, the H-block test is commonly accepted standard in the industry, see Adhesion of Rubbers to Fabrics, R. C. Moakes, India-Rubber Journal, vol. 71, No. 18, page 7. Investigation of a large number of nitroso substituted anilines by the H-block test revealed that only insignificant improvements were obtained. In some cases no increased adhesion at all was observed and although with many examples slight increase was observed, the adhesion was far below the requirements of the art and far below the adhesion achieved by present methods employed in the industry. However, dinitrosoresorcinol was exceptional in imparting adhesion efficiency comparable to the present treating agents and at the same time avoided the necessity of the rubber resin coating.

In order to set forth clearly and concisely the principles of the invention it will be described with particular reference to rayon and nylon cord. However, it is to be understood that other fibers may be substituted.

The objects of the invention are accomplished in general by applying to a cord in any suitable manner dinitrosoresorcinol. This may be accomplished by use of an aqueous solution or dispersion, or solution or dispersion in organic solvents, or in emulsion, or by adding the adhesion promotion substance to Viscose dope before forming into filaments. The treated cord is then embedded in a rubber compound and subsequently vulcanized to form a reinforced rubber article having improved properties. The rubber compound will of course contain the usual vulcanizing agents, accelerators, stabilizers, fillers and the like. In its preferred and common form the invention contemplates any compounded rubber stock, natural or synthetic, such as commonly employed in the fabrication of automobile tires, hose, raincoat materials, shoes, beltings such as conveyor belts, fan belts, driving belts, and the like.

In an example of the invention, rayon tire cord suitable for use in the manufacture of automobile tires was treated with water dispersions of dinitrosoresorcinol. The dispersions of dinitrosoresorcinol were prepared from technical dinitrosoresorcinol, a light yellow solid which changes to dark brown at 135–140° C. The quantity required for a dispersion of the desired concentration was dispersed in 2% aqueous ammonium caseinate solution by use of a Szegvari Attritor. The cord was led into the dispersion by passing it under an aluminum reel dipping in a body of the dispersion contained in an aluminum container. After the cord was pulled through the treating bath it was air dried. It may be squeegeed after leaving the bath but it was found in practice that this step is not essential. Furthermore, drying at elevated temperature, as for example under a bank of infrared lamps, is feasible if desired.

Rubber compositions were compounded comprising:

|  | Base A | Base B |
|---|---|---|
|  | Parts by weight | |
| Smoked sheets | 100 |  |
| GR-S 1500 |  | 100 |
| Carbon black | 25 | 25 |
| Zinc oxide | 5 | 5 |
| Saturated hydrocarbon softener | 3 | 7.5 |
| Sulfur | 2.5 | 3.0 |
| 2,2'-Dithiobis benzothiazole | 0.75 | 1.5 |
| Stearic acid | 1.0 |  |

The adhesion of the treated cord to these compositions was evaluated by placing the cord between samples of the raw stock, vulcanizing the assembly and measuring the force necessary to pull out the cord. The test samples were prepared by use of an improved mold developed after experience with the Armstrong mold. To avoid distortion of the rubber under stress thicker rubber sections were used. The specimens were still H shaped with the cross bar of the H representing cord extending through two sections of rubber but the rubber was in the form of cylinders ¾" in diameter and ¾" in height. The mold was composed of four 5" x 18" sections with the top and bottom sections solid plates to retain the rubber in the cavities of two perforated plates. The two halves of the inner section were 9/16" thick and contained two rows of 10 perforations. Cord channels about 30/1000" ran lengthwise across the diameters of the perforations. Overflow channels 1/16" deep were provided in both sections (at the top and botom of the cylinders to equalize the pressure).

The rubber compositions were sheeted from a mill to give a total gauge approximately equal to one-half the height of the cylinders and samples cut out to approximately the size required to fill one of the perforations. The treated cord was placed across the samples, the second perforated plate, filled with identical samples, placed on top, the two placed between the solid plates and the completed assembly cured by heating in a press for 30 minutes at 158° C. The cord was cut between each pair of cured cylinders to provide H shaped specimens, the sides of the H representing the rubber cylinders. Essentially, the quantity measured was the force required to pull a single cord in the direction of its axis from a cylinder of rubber in which one length of a cord of a given length was embedded. Thus, the quantity measured was the pounds shearing force acting across the cord to rubber interface.

The adhesion values obtained after treating the cord with dispersions of dinitrosoresorcinol of different concentrations as compared to the adhesion of the untreated cord are set forth in Table I. The amount of dinitrosoresorcinol absorbed by the cord was determined by weighing the dry cord before and after treatment. Thus, the pick-up is the percentage by which the cord increased in weight.

*Table I*

| Concentration of Dinitrosoresorcinol in the Dispersion | Pick-Up, Percent | Adhesion, Pounds | |
|---|---|---|---|
| | | Base A | Base B |
| None | None | 8.8 | 12.8 |
| 1.0% | 1.9 | 10.1 | 15.0 |
| 2.0% | 4.2 | 12.1 | 16.7 |
| 3.0% | 7.0 | 12.5 | 18.2 |
| 4.0% | 7.9 | 18.9 | 22.1 |
| 5.0% | 8.0 | 18.9 | 21.5 |
| 7.5% | 10.8 | 21.5 | 20.3 |
| 10.0% | 11.4 | 21.8 | 18.7 |

As exemplary of the results with other fibers nylon tire cord was substituted for rayon in the aforedescribed test procedure. Nylon tire cord was treated with a 10% aqueous dispersion of dinitrosoresorcinol as described and the adhesion values compared to those of the untreated cord. The results are summarized in Table II.

*Table II*

| | Pick-Up, Percent | Adhesion, Pounds | |
|---|---|---|---|
| | | Base A | Base B |
| Untreated | None | 6.2 | 6.0 |
| Treated | 10.8 | 15.6 | 15.2 |

Dinitrosoresorcinol has the very valuable property of inhibiting heat degradation of nylon cord. This property is illustrated by comparing the tensile strengths of treated and untreated cord after heat aging in an oven at 170° C. The tensile strengths are simply the pounds pull necessary to break the cord determined in the same machine (Dillon Tester) used to measure the adhesion values. Table III contains typical data which illustrate the stabilization.

*Table III*

| Concentration of Dinitrosoresorcinol in the Dispersion | Breaking Strength in Pounds of Nylon Cord after Heating | |
|---|---|---|
| | 24 Hrs. | 42 Hrs. |
| None | 4.8 | 2.7 |
| 1.0% | 5.8 | 3.2 |
| 4.0% | 7.8 | 4.6 |
| 7.5% | 13.5 | 8.6 |
| 10.0% | 13.8 | 8.8 |

To demonstrate the outstanding adhesive qualities of dinitrosoresorcinol, it was compared to other nitroso compounds known to have the properties of increasing adhesion of fibers to rubber. The same base compositions and test procedure were employed as described and 10% dispersions of the test materials used. The adhesion values obtained as compared to the adhesion of the untreated cord are set forth in Table IV.

RAYON TIRE CORD

| Material on Cord | Adhesion, Pounds Pull Out | | Percent Pickup on Cord |
|---|---|---|---|
| | Base A | Base B | |
| None—control | 8.8 | 12.8 | |
| Dinitrosoresorcinol | 21.8 | 18.7 | 11.4 |
| Increase in adhesion | 13.0 | 5.9 | |
| None—control | 8.4 | 14.6 | |
| o-Nitrosophenol | 8.8 | 12.5 | 4.3 |
| Increase in adhesion | 0.4 | ¹2.1 | |
| None—control | 9.7 | 11.5 | |
| p-Nitrosophenol | 9.9 | 14.9 | 8.4 |
| Increase in adhesion | 0.2 | 3.4 | |
| None—control | 9.9 | 12.0 | |
| o-Nitroso m-cresol | 12.6 | 14.1 | 5.1 |
| Increase in adhesion | 2.7 | 2.1 | |
| None—control | 9.9 | 12.0 | |
| α-Nitroso β-naphthol | 8.3 | 11.4 | 4.0 |
| Decrease in adhesion | 1.6 | 0.6 | |
| None—control | 7.9 | 11.7 | |
| N,N'-Dimethyl-p-nitrosoaniline | 9.4 | 12.8 | 1.7 |
| Increase in adhesion | 1.5 | 1.1 | |

NYLON TIRE CORD

| | | | |
|---|---|---|---|
| None—control | 6.2 | 6.0 | |
| Dinitrosoresorcinol | 15.6 | 15.2 | 10.8 |
| Increase in adhesion | 9.4 | 9.2 | |
| None—control | 6.2 | 8.4 | |
| o-Nitrosophenol | 6.1 | 7.6 | 1.0 |
| Decrease in adhesion | 0.1 | 0.8 | |
| None—control | 5.9 | 6.8 | |
| p-Nitrosophenol | 9.1 | 7.9 | 13.4 |
| Increase in adhesion | 3.2 | 1.1 | |
| None—control | 6.3 | 6.6 | |
| o-Nitroso m-cresol | 7.5 | 7.6 | 6.4 |
| Increase in adhesion | 1.2 | 1.0 | |
| None—control | 6.3 | 6.6 | |
| α-Nitroso β-naphthol | 6.9 | 7.0 | 5.4 |
| Increase in adhesion | 0.6 | 0.4 | |
| None—control | 7.3 | 7.4 | |
| N,N'-Dimethyl-p-nitrosoaniline | 6.4 | 7.6 | 5.4 |
| Increase in adhesion | ¹0.9 | 0.2 | |

¹ Decrease.

It is evident from the foregoing that when tested by the commonly accepted standard for measuring adhesion of fibers to rubber, dinitrosoresorcinol is a very effective agent for adhering tire cord to rubber while the other nitroso compounds tested exerted very slight or no adhesive action.

Dinitrosoresorcinol may exist in tautomeric equilibrium with the oxime. It is a yellow to brown solid which contains two moles of water of crystallization which are liberated at about 100–105° C. On further heating the compound darkens at 135–140° C. and decomposes at about 164–166° C. The preparation involves addition of nitrite to a cold acid solution of resorcinol. Preparations have been successful with sulfuric, hydrochloric or acetic acid in solutions considerably more concentrated than described in the literature, Ber. 8, 631 (1875). The following procedure gave an excellent yield: 69 grams of glacial acetic acid was disolved in 350 cc. of water, the solution cooled to 0° C., 55 grams of resorcinol added and then 71 grams of 97% $NaNO_2$ in 110 cc. of water added at 0–5° C. over a period of 25–30 minutes. The reaction mixture was stirred for an hour longer, filtered, washed thoroughly with water and dried in an oven at 50° C. The yield of dinitrosoresorcinol was 95% of the theoretical. Thorough washing with water constitutes sufficient purification.

It is intended to cover all changes and modifications of the examples of the invention herein chosen for purposes of disclosure which do not constitute departures from the spirit and scope of the invention.

This application is a continuation-in-part of Application Serial No. 503,347, filed April 22, 1955, now abandoned.

What is claimed is:

1. The method of treating fiber to enhance its adhesion to rubber which consist essentially of impregnating the fiber with dinitrosoresorcinol.
2. The method of treating rayon tire cord to enhance its adhesion to rubber which consists essentially of impregnating the rayon cord with dinitrosoresorcinol.
3. The method of treating nylon tire cord to enhance its adhesion to rubber which consists essentially of impregnating the nylon cord with dinitrosoresorcinol.
4. Vulcanized fiber reinforced rubber articles, said fiber being adhered to vulcanized compounded rubber by means of dinitrosoresorcinol.
5. Vulcanized rubber-rayon cord composite article, said rayon cord being adhered to vulcanized compounded rubber by means of dinitrosoresorcinol.
6. Vulcanized rubber-nylon cord composite article, said nylon cord being adhered to vulcanized compounded rubber by means of dinitrosoresorcinol.
7. Rayon cord impregnated with dinitrosoresorcinol.
8. A synthetic linear polycarbonamide fiber having the recurring —CONH— groups separated by hydrocarbon chains having incorporated thereon in sufficient amount to increase adhesion to rubber and to retard heat deterioration dinitrosoresorcinol.
9. Nylon cord impregnated with dinitrosoresorcinol.

References Cited in the file of this patent

UNITED STATES PATENTS

| | | |
|---|---|---|
| 2,835,624 | Cousins | May 20, 1958 |
| 2,905,582 | Coleman et al. | May 22, 1959 |

FOREIGN PATENTS

| | | |
|---|---|---|
| 522,568 | Great Britain | June 21, 1940 |